No. 751,563. PATENTED FEB. 9, 1904.
D. B. RUSHMORE.
DYNAMO ELECTRIC MACHINE.
APPLICATION FILED JUNE 26, 1903.

NO MODEL.

WITNESSES:

INVENTOR.
David B. Rushmore.
BY
ATTORNEY.

No. 751,563.

Patented February 9, 1904.

UNITED STATES PATENT OFFICE.

DAVID B. RUSHMORE, OF PITTSFIELD, MASSACHUSETTS, ASSIGNOR TO STANLEY ELECTRIC MANUFACTURING COMPANY, OF PITTSFIELD, MASSACHUSETTS, A CORPORATION OF NEW JERSEY.

DYNAMO-ELECTRIC MACHINE.

SPECIFICATION forming part of Letters Patent No. 751,563, dated February 9, 1904.

Application filed June 26, 1903. Serial No. 163,152. (No model.)

*To all whom it may concern:*

Be it known that I, DAVID B. RUSHMORE, a citizen of the United States, and a resident of Pittsfield, Massachusetts, have invented certain new and useful Improvements in Dynamo-Electric Machines, of which the following is a specification.

My invention relates to the field-magnets of dynamo-electric machines; and its object is to provide a structure which shall permit of more efficient ventilation of the field-coils than has been possible with former structures.

Figure 1:
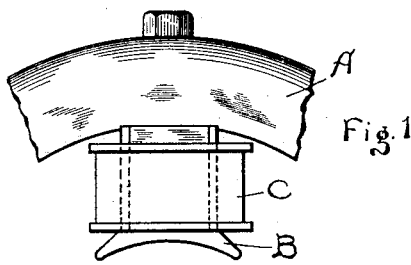
Figure 2:
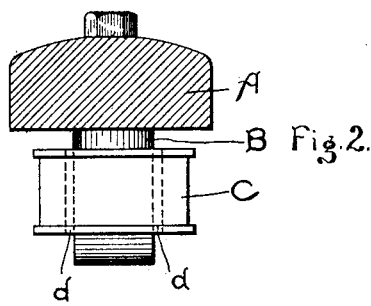
Figure 3:
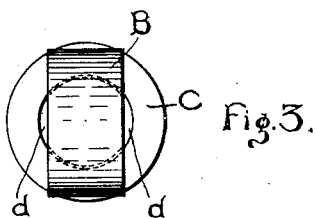

Referring to the drawings, Figure 1 shows a side view of part of the field-magnet embodying my invention. Fig. 2 shows an end view of the same, partly in cross-section; and Fig. 3 shows a view of the magnet-pole looking at the pole-shoe.

In the drawings, A represents the yoke of the field-magnet, on which is supported the field-pole B. Mounted on field-pole B is the field-coil C. This coil is circular in shape, while the field-pole is cut away on two sides into a roughly-elliptical shape, so as to leave spaces $d$ $d$ between the field-pole and the coil, as shown in the drawings. These spaces $d$ $d$ being on the sides of the field-pole toward the end of the armature are most favorably placed for receiving the air which is driven outward by the blower action of the ends of the armature-coils. Furthermore, the passage through these spaces is unobstructed by the pole-shoe. Thus the armature blower action is utilized most advantageously for the ventilation of the field-coil.

Although it is not necessary that the field-coil C should be exactly circular, nevertheless this form of coil gives the shortest length of wire compatible with ventilation of the coil and is therefore the best to use in all cases where it is possible.

The oval shape of the field-pole is especially advantageous in high-speed machines, since it gives a dimension of the pole around the circumference greater than the dimension lengthwise of the armature. This relation of the pole dimensions is desirable in machines of the high-speed type.

I do not desire to limit myself to the particular construction and arrangement of parts here shown, since changes therein which do not depart from the spirit of my invention and which are within the scope of the appended claims will be obvious to those skilled in the art.

Having thus fully described my invention, I claim as new and desire to protect by Letters Patent—

1. In a dynamo-electric machine, field-coils, and poles supporting said coils, said poles being cut away so as to leave spaces between said coils and said poles.

2. In a dynamo-electric machine, field-coils, and poles supporting said coils, said poles being cut away in the sides toward the ends of the armature so as to leave spaces between said coils and said poles.

3. In a dynamo-electric machine, circular field-coils, and poles supporting said coils, the sides of said poles toward the ends of the armature being cut away.

4. In a dynamo-electric machine, field-poles of approximately elliptical cross-section, and field-coils of circular form supported thereon.

5. In a dynamo-electric machine, field-coils, and field-poles supporting said coils, said poles being cut away on two sides so as to leave segmental spaces between said poles and said coils.

6. In a dynamo-electric machine, field-poles, and coils mounted thereon, said poles being shaped so as to leave segmental spaces between said poles and said coils on the sides opposite the ends of the armature.

7. In a dynamo-electric machine, field-poles having cross-sections rectangular with rounded ends, and field-coils of circular form mounted thereon.

Signed at Pittsfield, Massachusetts, this 23d day of June, 1903.

DAVID B. RUSHMORE.

Witnesses:
L. A. HAWKINS,
R. E. HAYNES.